United States Patent
Sugi et al.

(10) Patent No.: US 7,219,559 B2
(45) Date of Patent: May 22, 2007

(54) FLOW METER USING DIGITAL SIGNALS

(75) Inventors: Tokio Sugi, Tokyo (JP); Tomoyuki Okumura, Tokyo (JP)

(73) Assignees: Tokyo Keiso Co., Ltd., Tokyo (JP); Tokyo Magnet Engineering Co., Ltd., Tokyo (JP)

( * ) Notice: Subject to any disclaimer, the term of this patent is extended or adjusted under 35 U.S.C. 154(b) by 0 days.

(21) Appl. No.: 11/198,838

(22) Filed: Aug. 5, 2005

(65) Prior Publication Data

US 2006/0112772 A1 Jun. 1, 2006

(30) Foreign Application Priority Data

Nov. 29, 2004 (JP) .............................. 2004-344032

(51) Int. Cl.
*G01F 1/24* (2006.01)
(52) U.S. Cl. ................................................. 73/861.56
(58) Field of Classification Search ...................... None
See application file for complete search history.

(56) References Cited

U.S. PATENT DOCUMENTS 2,808,580 A * 10/1957 Fuller ...................... 73/861.55
4,630,485 A * 12/1986 Wastl, Sr. ................ 73/861.56
6,591,694 B2 * 7/2003 Tsai et al. ................ 73/861.57

FOREIGN PATENT DOCUMENTS

JP    2001-221666    8/2001

* cited by examiner

*Primary Examiner*—Harshad Patel
(74) *Attorney, Agent, or Firm*—Lucas & Mercanti, LLP

(57) ABSTRACT

A flow meter outputs an electric signal of a position a float within a taper-shaped tube precisely. A taper-shaped tube is made of an approximately transparent material, is mounted approximately vertically, and circulates a fluid such as water or the like, and a float is arranged within the taper-shaped tube so as to displace in a vertical direction in correspondence to a flow rate of the fluid. An LED irradiates a light ray to the taper-shaped tube and the float, makes the light ray to transmit through the taper-shaped tube, and generates a transmitted light ray. The image sensor outputs a digital image of the float within the taper-shaped tube, and a control portion 11 executes an input process of the digital signal detects the position of the float, and outputs an electric signal showing a flow rate of the fluid.

5 Claims, 7 Drawing Sheets

(a)

(b)

(a)

(b)

(e)

(c)

(d)

FLOW METER USING DIGITAL SIGNALS

TECHNICAL FIELD

The present invention relates to a flow meter for measuring a flow rate of a fluid by detecting a position of a float within a taper-shaped tube by means of an image sensor.

BACKGROUND ART

In conventional, in Japanese Unexamined Patent Publication No. 2001-221666, the inventor of the present invention has proposed an area flow meter having a sensor which is precise, compact and inexpensive. The conventional area flow meter having the sensor is structured such that a float moving up and down on the basis of a flow rate is provided within the taper tube having a translucency, a fluid to be measured flows therein from an inflow port in a lower portion and flows toward an inflow port in an upper portion, and plural sets of image sensor units each constituted by an optical lens and an image sensor are arranged along a vertical direction in one side of the taper tube.

DISCLOSURE OF INVENTION

Accordingly, an object of the present invention is to provide a flow meter which is structured in a compact size, and outputs an electric signal of a position of a float within a taper-shaped tube precisely.

In order to achieve the object mentioned above, in accordance with the present invention, there is provided with a flow meter comprising:

a taper-shaped tube which is made of an approximately transparent or semi-transparent material, is mounted approximately vertically, and circulates a fluid;

a float which is arranged within the taper-shaped tube so as to be displaced in a vertical direction in correspondence to a flow rate of the fluid;

a light emitting means which irradiates a light ray to the taper-shaped tube and the float, and transmits or reflects the light ray;

a first mirror to which the transmitted or reflected light ray is input and reflected;

a second mirror to which the transmitted or reflected light ray is input and reflected from the first mirror;

an image sensor to which the transmitted or reflected light ray is input from the second mirror, and which outputs a digital image of the float within the taper-shaped tube; and a control portion which executes an input process of the digital signal, detects the position of the float within the taper-shaped tube, and outputs an electric signal showing the flow rate.

In accordance with the flow meter of the present invention, since the structure is made such that the light emitting means irradiates the light ray to the taper-shaped tube and the float, and transmits or reflects the light ray, and the transmitted or reflected light ray is sequentially input and reflected to the first mirror and the second mirror, and is input to the image sensor, a distance between the taper-shaped tube, and the float and the image sensor is formed short in spite that a required optical path length of the transmitted or reflected light ray can be secured, so that a whole can be structured compact.

Further, since the image sensor is used in place of a light receiving element array, a resolving power is high, so that it is possible to output an electric signal of the position of the float within the taper-shaped tube with a high precision.

BEST MODE FOR CARRYING OUT THE INVENTION

A description will be given of the present invention on the basis of embodiments with reference to the accompanying drawings.

Figure 1:
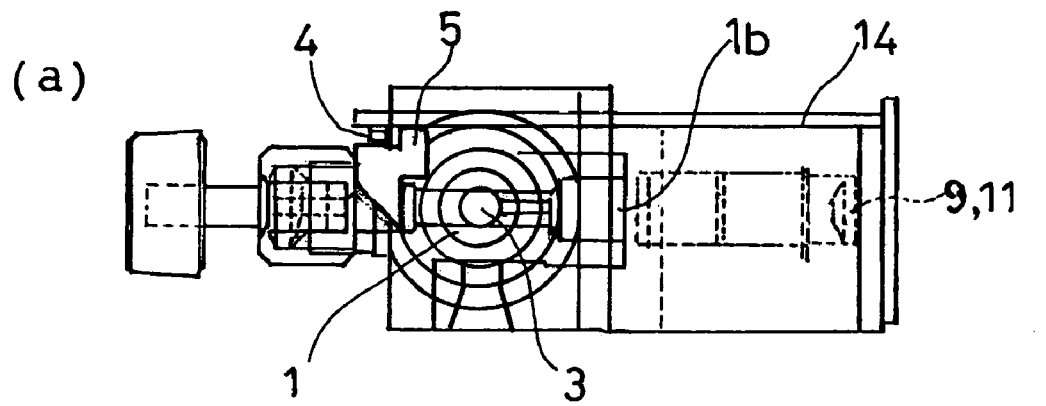
FIG. 1A is a plan view including a cross sectional view of an embodiment 1 in accordance with the present invention.
FIG. 1B is a front elevational view including a cross sectional view.
Figure 1:
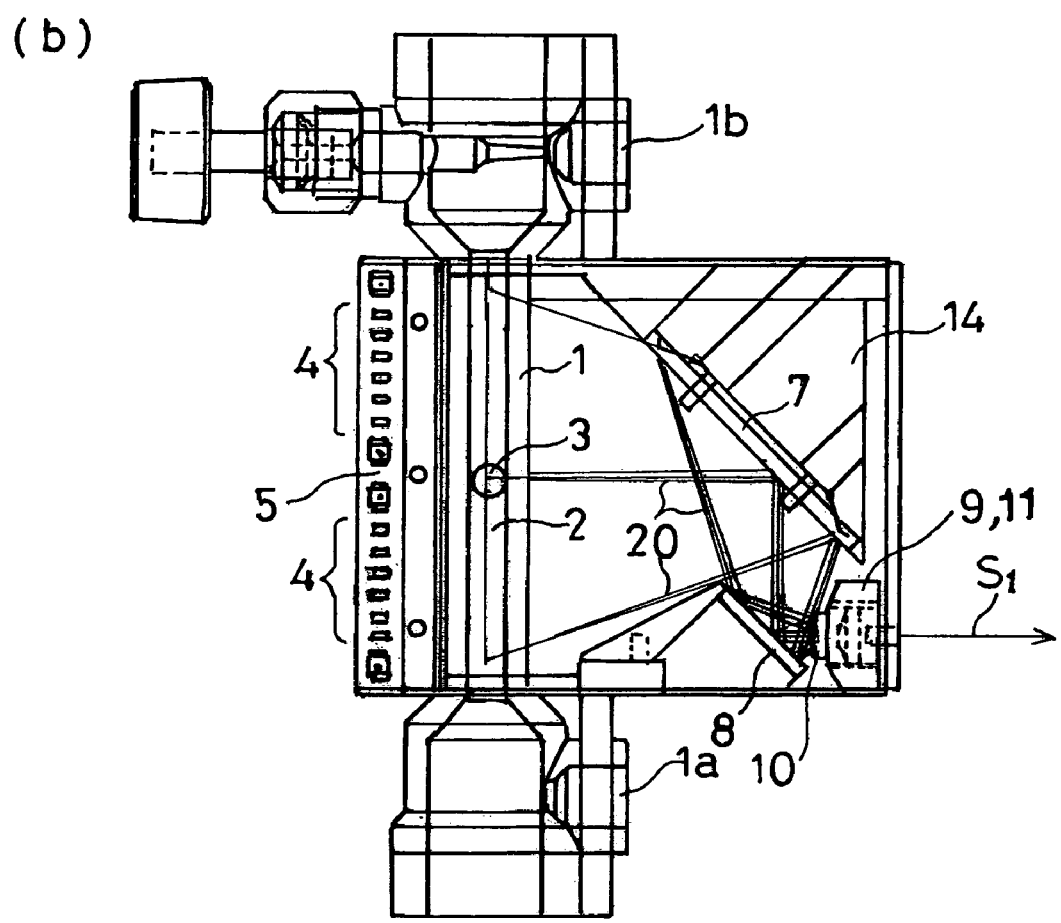
Figure 2:
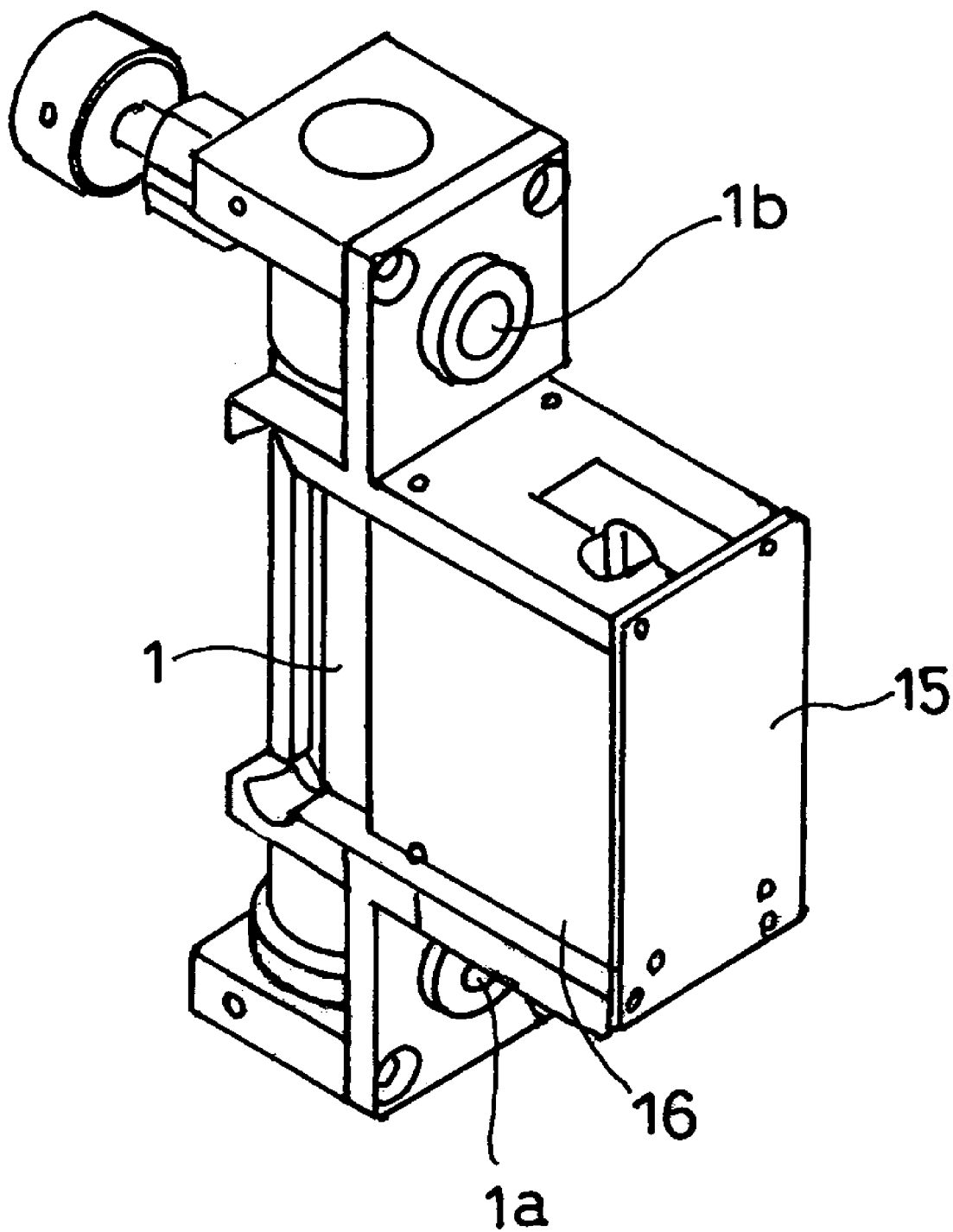
FIG. 2 is a perspective view of the embodiment 1 in accordance with the present invention.
Figure 3:
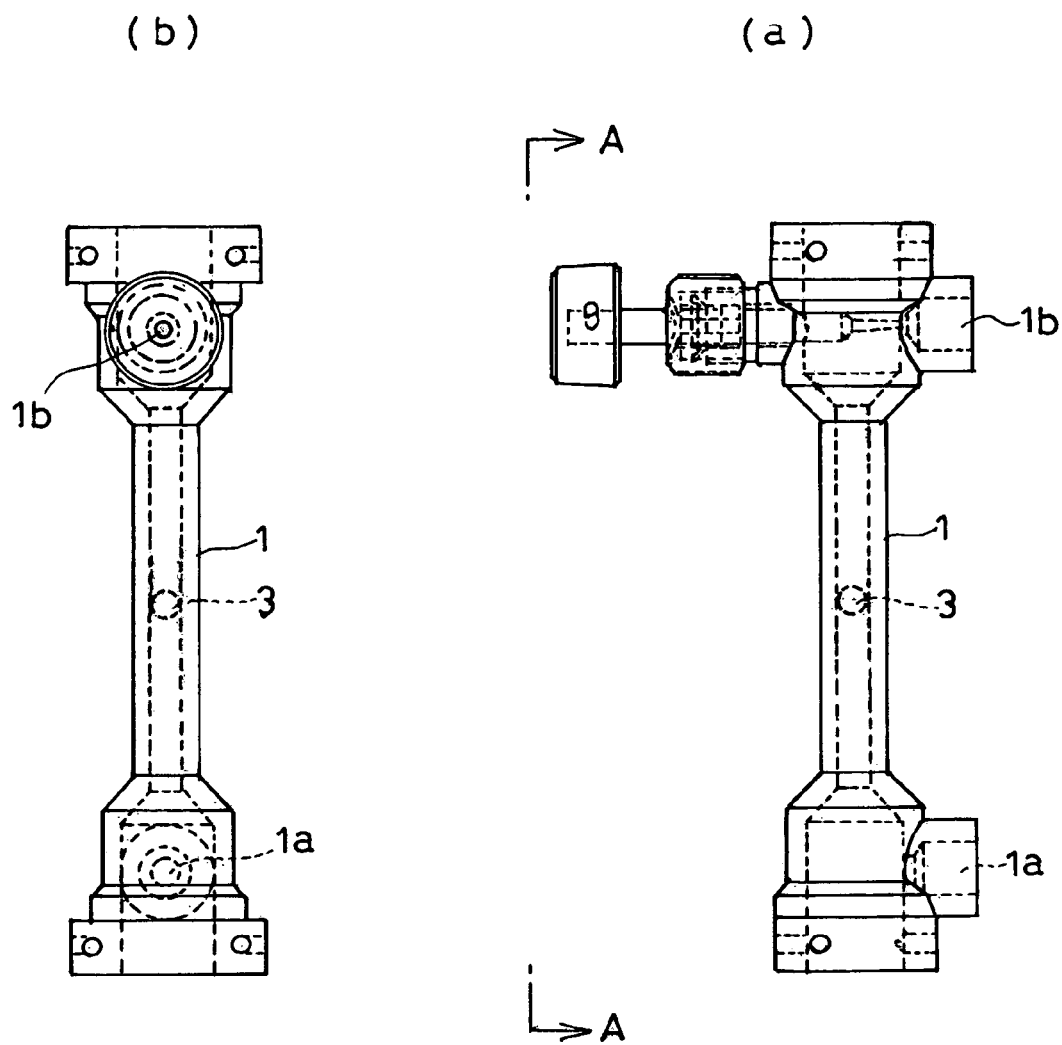
FIG. 3A is a front elevational view including a partial cross section of a taper-shaped tube structuring the embodiment 1 in accordance with the present invention.
FIG. 3B is a view as seen from an arrow A—A in FIG. 3A.
Figure 4:
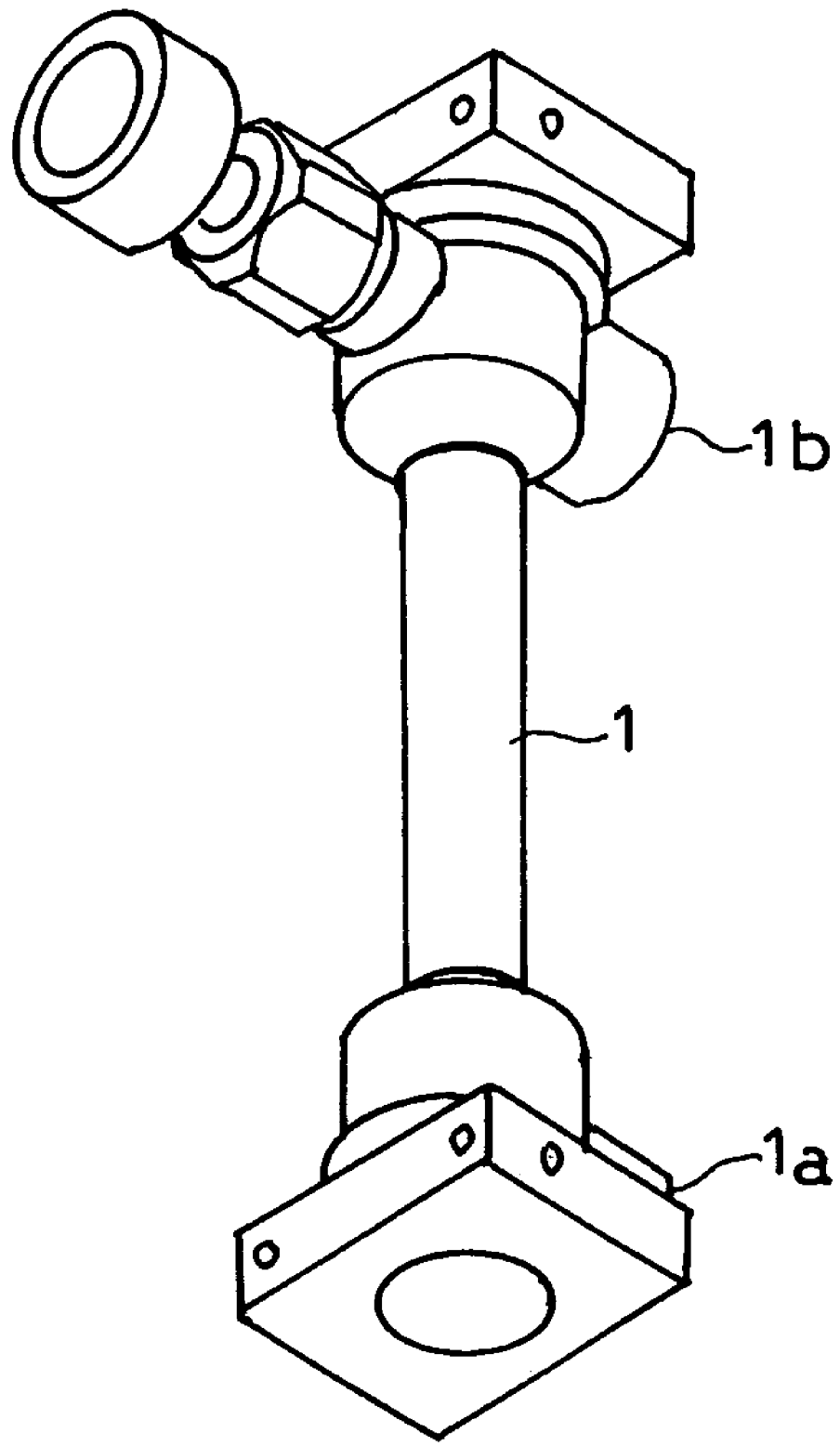
FIG. 4 is a perspective view of the taper-shaped tube structuring the embodiment 1 in accordance with the present invention.

FIG. 1A is a plan view including a partial cross section of an embodiment 1 in accordance with the present invention, FIG. 1B is a front elevational view including a partial cross section, FIG. 2 is a perspective view, FIG. 3A is a front elevational view including a partial cross section of a taper-shaped tube structuring the embodiment 1 in accordance with the present invention, FIG. 3B is a view as seen from an arrow A—A in FIG. 3A, and FIG. 4 is a perspective view.

A taper-shaped tube 1 is made of an approximately transparent or semi-transparent material, is mounted approximately vertically, and circulates a fluid 2 such as a water or the like. The measured fluid 2 flows therein from an inflow port 1a in a lower portion, and flows out from an outflow port 1b in an upper portion. A float 3 is arranged within the taper-shaped tube 1 so as to displace in a vertical direction in correspondence to a flow rate of the fluid 2.

As shown in FIGS. 5A, 5B, 5C, 5D, 5E and 6, a light emitting means is constituted by an LED 4, irradiates the light ray to the taper-shaped tube 1 and the float 3, and makes the light ray to transmit through the taper-shaped tube 1 so as to form a transmitted light ray 20.

Figure 5:
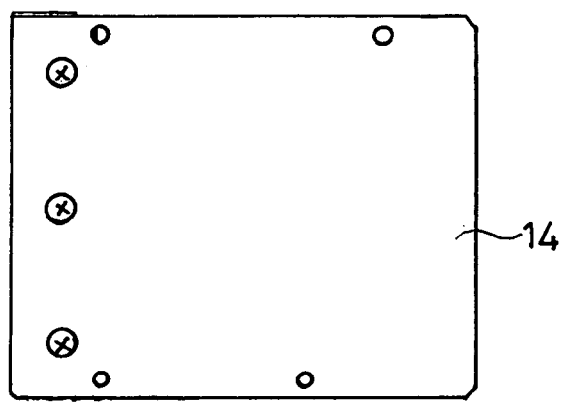
FIG. 5 is a schematic view of an LED and a polarizing prism structuring the embodiment 1 in accordance with the present invention.
Figure 5:
Figure 5:
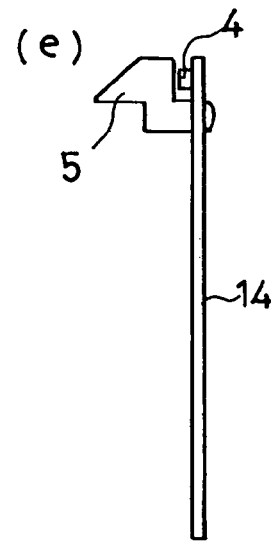
Figure 5:
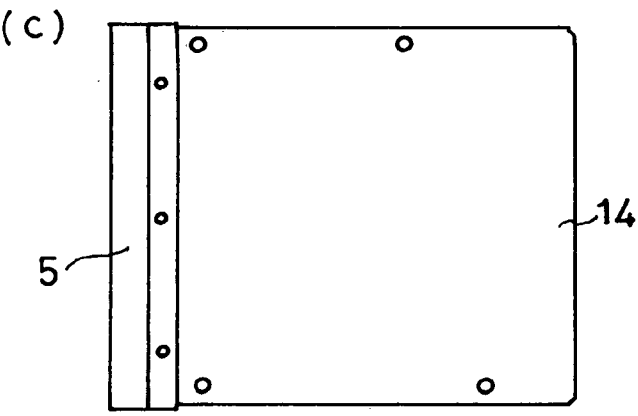
Figure 5:
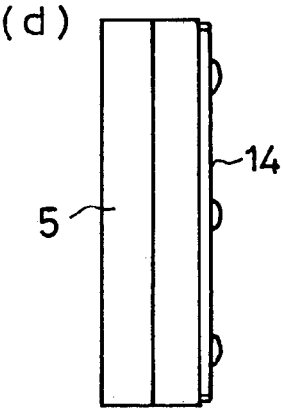
Figure 6:
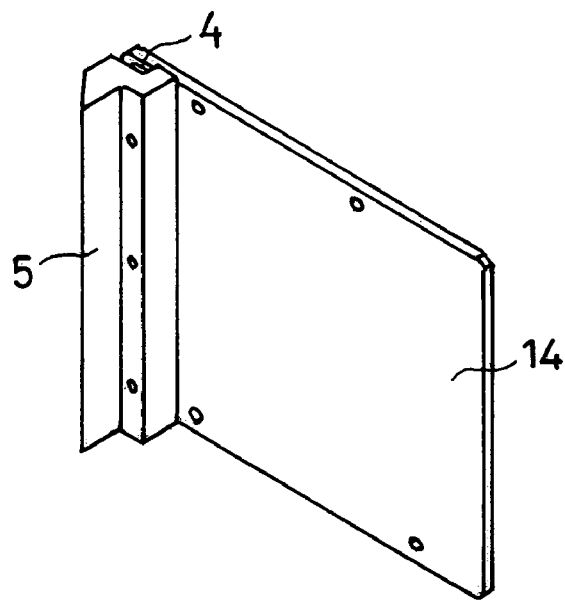
FIG. 6 is a perspective view of the LED and the polarizing prism structuring the embodiment 1 in accordance with the present invention.

A plurality of LED 4 are arranged along the taper-shaped tube 1, a polarizing prism 5 uniformizes the light ray irradiated from the LED 4, and refracts an optical path of the light ray so as to irradiate to the taper-shaped tube 1 and the float 3. As shown in FIGS. 5 and 6, the LED 4 and the polarizing prism 5 are fixed to a plate 14, and are closed by plates 15 and 16 as shown in FIG. 2.

A first mirror 7 is structured such that the transmitted light ray 20 is input and reflected thereto, and a second mirror 8 is structured such that the transmitted light ray 20 is input and reflected thereto from the first mirror 7.

Figure 8:
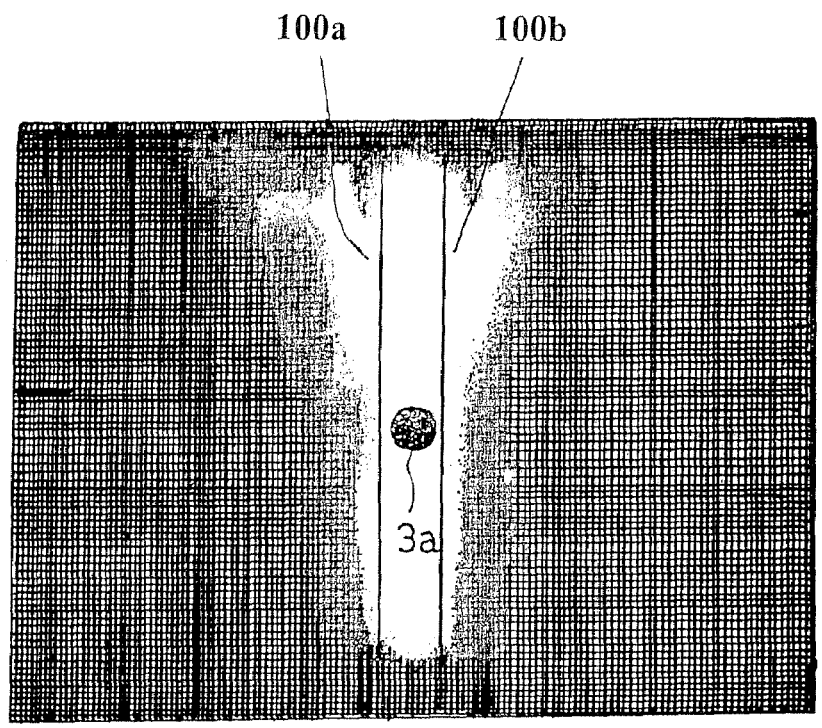
FIG. 8 is a digital image view obtained by imaging the transmitted or reflected light ray in accordance with the embodiment 1 of the present invention by an image sensor.

The transmitted light ray 20 is input to an image sensor 9 such as a CCD type, a CMOS type, a POC type or the like image sensor from the second mirror 8, and the image sensor 9 outputs digital images 100*a*, 100*b* and 3*a* of the float 3 within the taper-shaped tube 1, which are shown in FIG. 8.

In the present embodiment 1, a lens 10 for compensating a difference in an optical path length of the transmitted light ray 20 is provided just before the image sensor 9.

Figure 9:
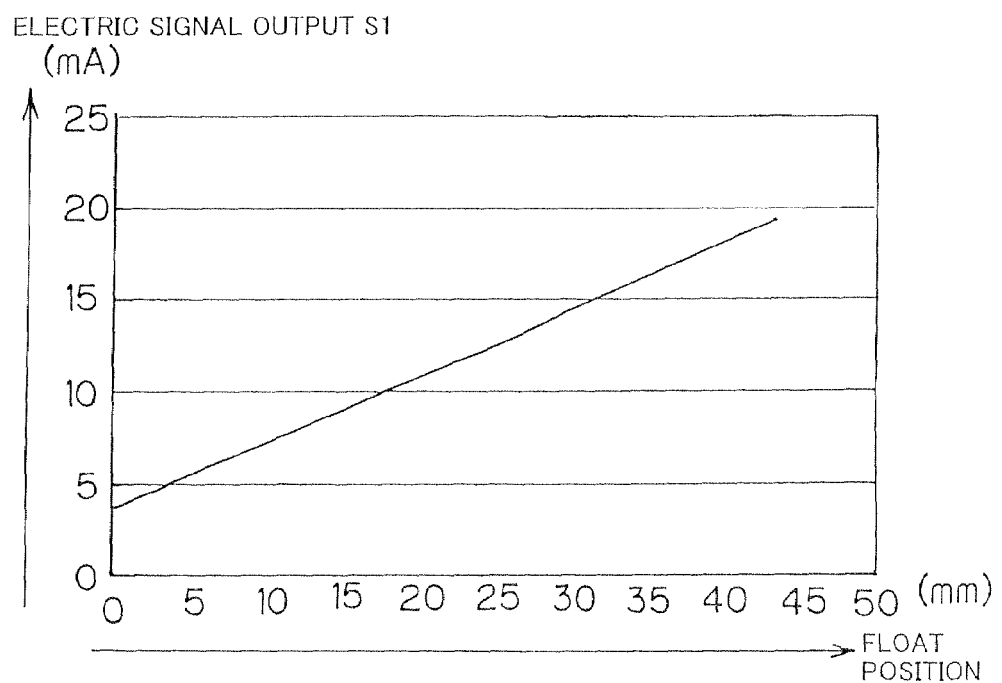
FIG. 9 is an explanatory view showing a relation between an electric signal output from the embodiment 1 in accordance with the present invention and a position of a float.

A control portion 11 executes an input process of the digital images 100*a*, 100*b* and 3*a*, detects the position of the float 3 within the taper-shaped tube 1 and outputs an electric signal SI shown in FIG. 9 showing a flow rate of the fluid 2. The electric signal SI displays the flow rate of the fluid 2 by means of a display meter (not shown) or the like.

Figure 7:
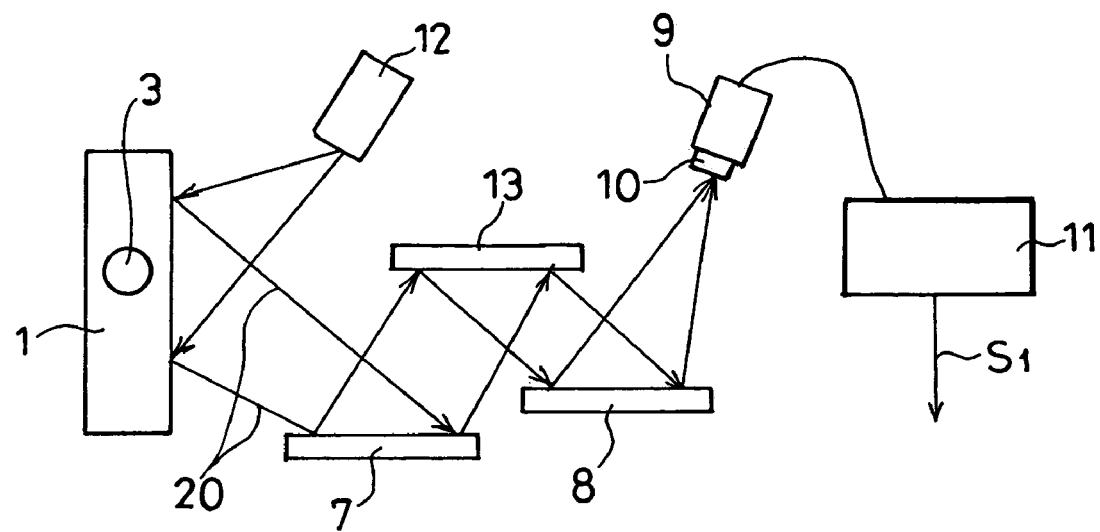
FIG. 7 is a schematic view of an embodiment 2 in accordance with the present invention.

In an embodiment 2 in accordance with the present invention shown in FIG. 7, the light emitting means is constituted by a liquid crystal 12 or the like corresponding to a luminous body uniformly emitting and irradiating the light ray.

Further, a projector 12 such as a slide projector or the like corresponding to the light emitting means reflects the light ray to the taper-shaped tube 1 and the float 3, and forms the reflected light ray 20.

Further, one or more third mirrors 13 are interposed between the first mirror 7 and the second mirror 8, and the transmitted or reflected light ray 20 is sequentially input and reflected.

What is claimed is:

1. A flow meter comprising:

a taper-shaped tube which is made of an approximately transparent or semi-transparent material, is mounted approximately vertically, and circulates a fluid;

a float which is arranged within said taper-shaped tube so as to be displaced in a vertical direction in correspondence to a flow rate of said fluid;

a light emitting means which irradiates a light ray to said taper-shaped tube and said float, and transmits or reflects the light ray;

a first mirror to which said transmitted or reflected light ray is input and reflected;

a second mirror to which said transmitted or reflected light ray is input and reflected from said first mirror;

an image sensor to which said transmitted or reflected light ray is input from said second mirror, and which outputs a digital image of said float within said taper-shaped tube; and a control portion which executes an input process of said digital signal, detects the position of said float within said taper-shaped tube, and outputs an electric signal showing said flow rate.

2. A flow meter as claimed in claim 1, further comprising one or more third mirrors which are interposed between said first mirror and said second mirror, and to which said transmitted or reflected light ray is sequentially input and reflected.

3. A flow meter as claimed in claim 1, wherein said light emitting means is constituted by a plurality of LED arranged along said taper-shaped tube, and the flow meter is provided with a polarizing prism which uniformizes said light ray irradiated from said LED, and refracts an optical path of said light ray so as to irradiate to said taper-shaped tube and said float.

4. A flow meter as claimed in claim 1, wherein said light emitting means is constituted by a luminous body uniformly emitting and irradiating said light ray.

5. A flow meter as claimed in claim 1, wherein a lens for compensating a difference in an optical path length of said transmitted or reflected light ray is provided just before said image sensor.

* * * * *